US010203130B2

(12) United States Patent
Gardikis, Sr. et al.

(10) Patent No.: US 10,203,130 B2
(45) Date of Patent: Feb. 12, 2019

(54) UNIVERSAL AIR CONDITIONING SUPPORT BRACKET

(71) Applicants: David Paul Gardikis, Sr., Westport, MA (US); David Paul Gardikis, Jr., Somerset, MA (US); Daniel Robert Gardikis, Westport, MA (US); Paul Trenholme, Somerset, MA (US)

(72) Inventors: David Paul Gardikis, Sr., Westport, MA (US); David Paul Gardikis, Jr., Somerset, MA (US); Daniel Robert Gardikis, Westport, MA (US); Paul Trenholme, Somerset, MA (US)

( * ) Notice: Subject to any disclaimer, the term of this patent is extended or adjusted under 35 U.S.C. 154(b) by 0 days.

(21) Appl. No.: 15/655,267

(22) Filed: Jul. 20, 2017

(65) Prior Publication Data

US 2018/0023842 A1 Jan. 25, 2018

Related U.S. Application Data

(60) Provisional application No. 62/364,598, filed on Jul. 20, 2016.

(51) Int. Cl.
| | |
|---|---|
| *F24F 13/32* | (2006.01) |
| *F16M 13/02* | (2006.01) |
| *F16M 11/10* | (2006.01) |
| *E04G 3/18* | (2006.01) |

(52) U.S. Cl.
CPC ............... *F24F 13/32* (2013.01); *E04G 3/18* (2013.01); *F16M 11/10* (2013.01); *F16M 13/02* (2013.01); *F24F 1/027* (2013.01)

(58) Field of Classification Search
CPC ........ F24F 13/32; F24F 1/027; F24F 2221/20; A47L 3/02; E04G 3/18
See application file for complete search history.

(56) References Cited

U.S. PATENT DOCUMENTS

| | | | | |
|---|---|---|---|---|
| 598,860 | A * | 2/1898 | Dean .................... | A47L 3/02 182/62 |
| 1,531,159 | A * | 3/1925 | Timmons ............... | A47L 3/02 248/236 |
| 1,949,820 | A * | 3/1934 | Timmons ............... | A47L 3/02 182/113 |
| 2,292,379 | A * | 8/1942 | Jirasek .................. | E04G 3/18 182/129 |
| 2,420,635 | A * | 5/1947 | Workman .............. | A47L 3/02 182/61 |
| 2,935,284 | A * | 5/1960 | Reeves .................. | E04G 3/18 248/208 |
| 3,010,534 | A * | 11/1961 | Borke .................... | E04G 3/18 182/58 |
| 5,636,816 | A * | 6/1997 | Burton .................. | F24F 13/32 248/208 |
| 8,091,844 | B1 * | 1/2012 | Bragg ................... | F24F 13/32 248/208 |

(Continued)

*Primary Examiner* — Bradley Duckworth
(74) *Attorney, Agent, or Firm* — Dunlap Bennett & Ludwig PLLC; Brendan E. Squire

(57) ABSTRACT

An air-conditioner support bracket does not require any drilling into the home and has a higher weight rating of 150 lb. The support bracket is configurable to accommodate a wide range of window Air Conditioning unit shapes and sizes, is adaptable to a variety of opening widths, and may be tilted to support the air conditioning unit in a horizontal position.

19 Claims, 4 Drawing Sheets

(56) References Cited

U.S. PATENT DOCUMENTS

| | | | |
|---|---|---|---|
| 8,167,260 B2 * | 5/2012 | Boccia | F24F 13/32 248/208 |
| 8,584,998 B1 * | 11/2013 | Peterson | F24F 13/32 182/62 |
| 9,163,854 B2 | 10/2015 | Arbucci | |
| 9,303,895 B1 | 4/2016 | Grant | |
| 9,605,870 B2 | 3/2017 | Darby et al. | |

* cited by examiner

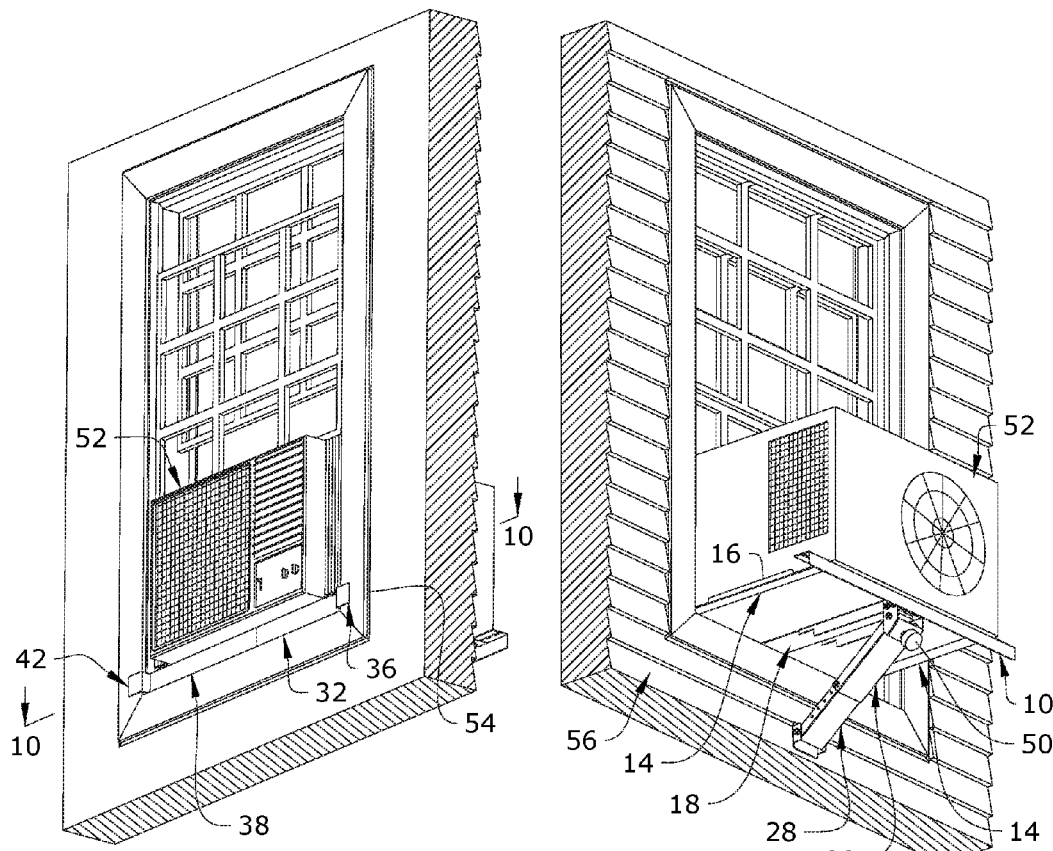
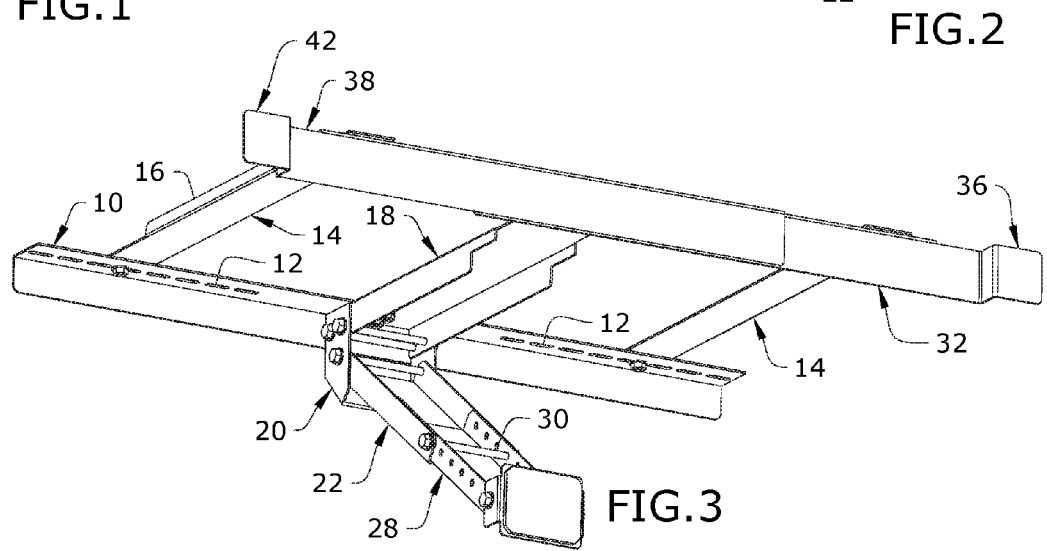

UNIVERSAL AIR CONDITIONING SUPPORT BRACKET

CROSS-REFERENCE TO RELATED APPLICATION

This application claims the benefit of priority of U.S. provisional application No. 62/364,598, filed Jul. 20, 2016, the contents of which are herein incorporated by reference.

BACKGROUND OF THE INVENTION

The present invention relates to air conditioning, and more particularly to supports and mounting brackets for air conditioning units.

Window air-conditioners are often dropped out of windows during installation and can fall from windows during the season. Window air-conditioner installation is often complicated and cumbersome.

Other products require drilling into the home or window frame to install, have lower weight ratings and are not universally compatible. These other devices are not compatible with all window air-conditioners and typically only support up to 80 lbs.

As can be seen, there is a need for an air conditioner support bracket that does not require any drilling into the home and has a higher weight rating of 150 lbs.

SUMMARY OF THE INVENTION

In one aspect of the present invention, an air conditioner (AC) support bracket for installing an AC unit in a fenestration of a structure. The AC support bracket includes a front rail element having a wing extension defined at a left and a right end of the front rail element. The wing extensions are configured to abut a frame surrounding an interior of the fenestration. A side rail element interconnects the front rail element to an aft rail element. The side rail element has a substantially flat surface configured to support a bottom surface of the AC unit. An intermediate support member also has a substantially flat top surface is configured to be attached between the front rail element and the aft rail element. A pivot bracket attached to an aft end of the intermediate support member. The pivot arm is configured for pivotal attachment to the pivot bracket, where the pivot arm having an adjustable length by cooperative engagement of a first pivot arm segment and a second pivot arm segment.

Preferably, the front rail element includes a right rail segment and a left rail segment. A plurality of slotted apertures may be defined in a spaced apart relation through a top surface each of the right rail segment and the left rail segment, wherein the right rail segment and the left rail segment are joinable to a length corresponding to a width of the fenestration, such that the wing extensions are positioned for abutment with the frame.

In some embodiments, the intermediate support bracket further includes a downwardly extending sidewall along a longitudinal length of the intermediate support bracket and the pivot arm bracket is attached to the downwardly extending sidewall. In other embodiments, the side rail element may include a raised lip extending along a longitudinal length of the side rail; such that the lip is configured to abut with a side surface of the AC unit supported on the AC support bracket.

A pivot aperture may be defined at an aft end of the first pivot arm segment, and a corresponding pivot aperture defined in the pivot bracket, a fastener is received through the pivot aperture and the corresponding pivot aperture.

The second pivot arm segment may include a plurality of apertures defined in a spaced apart relation in a lateral sidewall thereof. The plurality of apertures are configured to adjustably join the first pivot arm segment to the second pivot arm segment.

In yet other embodiments, a threaded shaft that is rotatable via an adjustment knob may be threadingly received within the pivot bracket and is configured to adjust the pivotal displacement of the pivot arm carried in the pivot bracket. The pivot arm may also include a support foot pivotally attached to a front end of the second pivot arm segment, the support foot having a substantially flat front surface configured to be placed in abutment with an exterior surface of the structure. A cushioned foot pad may be attached to the front surface of the support foot.

In other embodiments, an AC support bracket for installing an AC unit in a fenestration, may include an adjustable length front rail element having a wing extension defined at a left and a right end of the front rail element. The wing extensions are configured to abut an interior face of the fenestration. The front rail element may have a right rail segment and a left rail segment and a plurality of slotted apertures defined in a spaced apart relation through a top surface each of the right rail segment and the left rail segment. The right rail segment and the left rail segment are joinable to a length corresponding to a width of the fenestration, such that the wing extensions are positioned for abutment with the frame. A side rail element interconnects the front rail element to an aft rail element. The side rail element having a substantially flat surface configured to support a bottom surface of the AC unit. An intermediate support member with a substantially flat top surface is configured to be adjustably attached between the front rail element and the aft rail element at a lateral position corresponding to a center of gravity of the AC unit. A pivot arm is configured for pivotal attachment to an aft end of AC support bracket. The pivot arm has an adjustable length by cooperative engagement of a first pivot arm segment and a second pivot arm segment, to place a front end of the pivot arm in supporting abutment against an exterior surface of the fenestration.

These and other features, aspects and advantages of the present invention will become better understood with reference to the following drawings, description and claims.

BRIEF DESCRIPTION OF THE DRAWINGS

FIG. 1 is an interior perspective view of the air conditioner support bracket shown in use;

FIG. 2 is an exterior perspective view of the air conditioner support bracket shown in use;

FIG. 3 is a perspective view of the air conditioner support bracket;

DETAILED DESCRIPTION OF THE INVENTION

Figure 4:
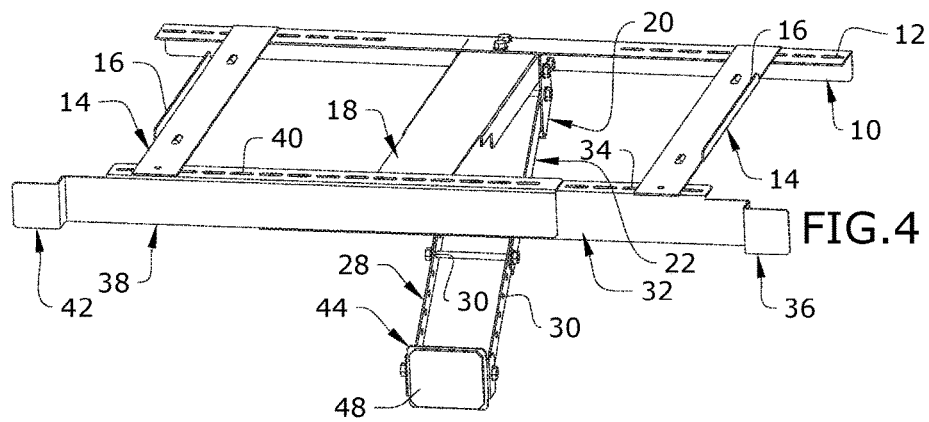
FIG. 4 is a perspective view of the air conditioner support bracket shown in an exemplary initial configuration.
Figure 5:
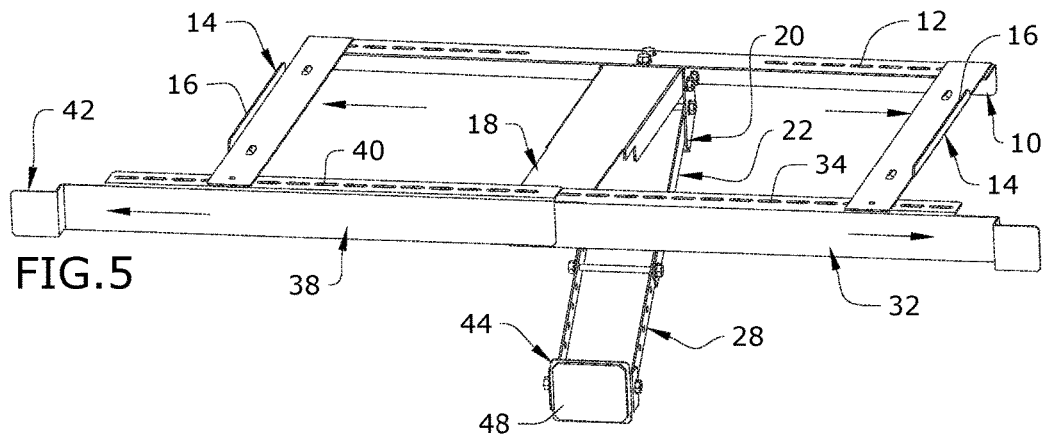
FIG. 5 is a perspective view of the air conditioner support bracket shown in an exemplary secondary configuration.
Figures 6, 7:
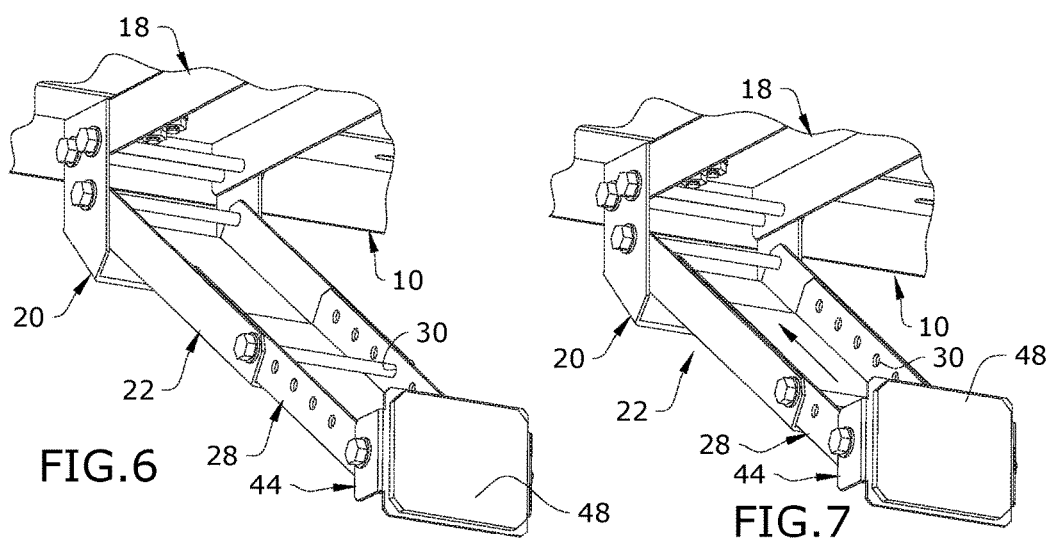
FIG. 6 is a perspective detail view of the air conditioner support bracket shown in an exemplary initial configuration.
FIG. 7 is a perspective detail view of the air conditioner support bracket shown in an exemplary secondary configuration.
Figure 8:
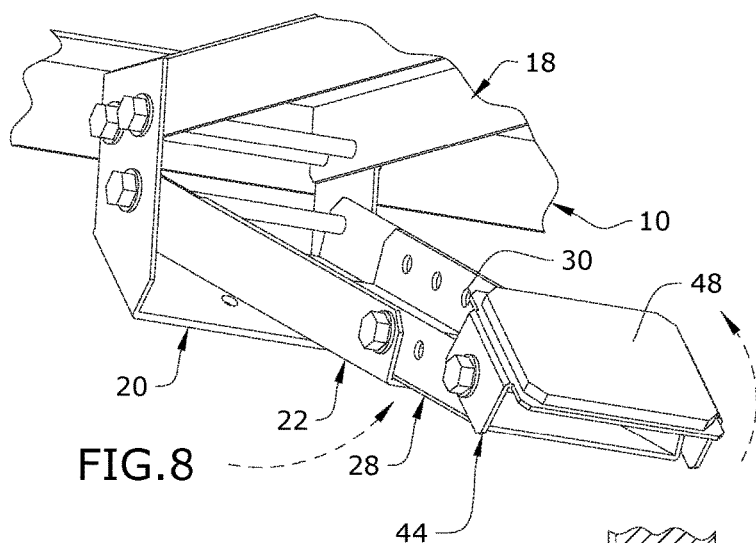
FIG. 8 is a perspective detail view of the air conditioner support bracket demonstrating exemplary articulation.
Figure 9:
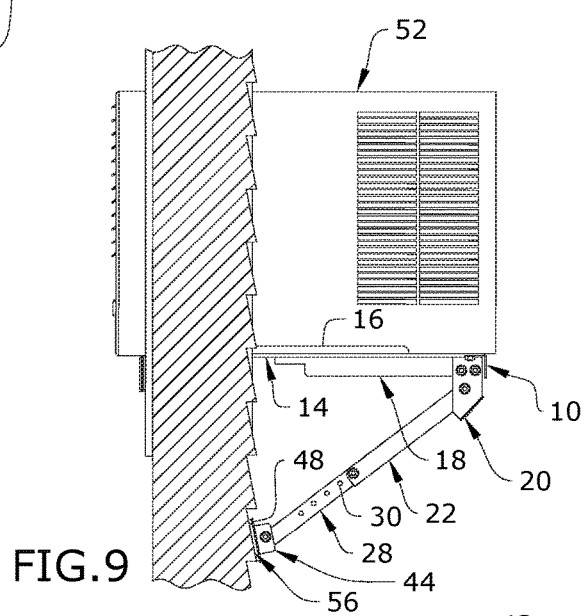
FIG. 9 is a side view of the air conditioner support bracket shown in use.
Figure 10:
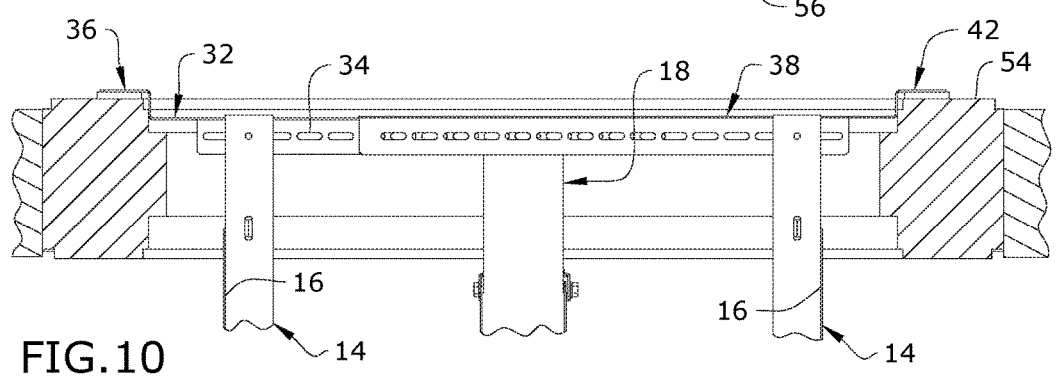
FIG. 10 is a section detail view of the air conditioner support bracket taken along line 10-10 in FIG. 1. Shown without AC unit for illustrative clarity.
Figure 11:
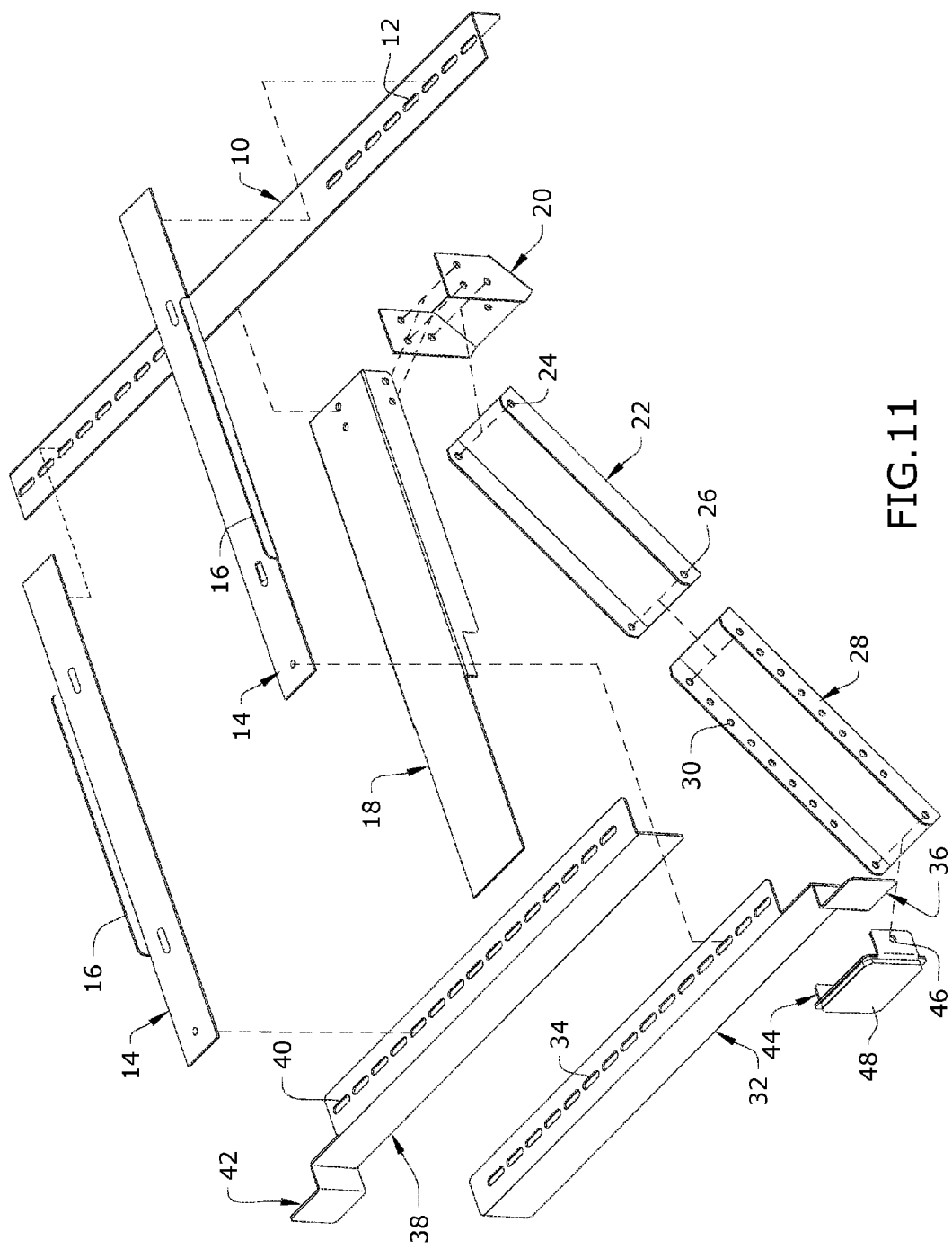
FIG. 11 is an exploded view of the air conditioner support bracket.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides an air conditioner support bracket that is compatible with all brands of window air-conditioner units with no need for drilling holes into a structure during installation. The bracket of the present invention simplifies air-conditioner installation by providing a working surface to support the air-conditioner during installation. The support bracket does not require drilling to install, using specialized features to hook onto the inside of a fenestration in a wall surface and an adjustable pivot arm to support the air conditioner against an exterior wall surface. The invention is compatible with all brands of air-conditioners.

As seen in reference to FIGS. 1 and 2, the air conditioner support bracket of the present invention is shown in use to mount an air conditioning unit 52 in a wall opening, such as a window of a structure. A front end of the air conditioning unit 52 includes an air outlet that delivers conditioned air into an interior of the structure. The front end of the unit 52 has a low profile projecting through the window opening to the interior of the structure. A majority of the air condition unit 52 projects outwardly from the window opening such that a substantial portion of the weight of the unit 52 requires support from the exterior of the structure to carry the air conditioning unit 52. To adequately install the air conditioning unit, the front end should retained in position within the window opening.

The universal air conditioning support bracket of the present invention includes a plurality of frame members that are interconnected to mount and support an air conditioning unit within a window without the need for drilling fasteners into the structural members around the window opening or an exterior surface of the structure in which it is installed. The bracket is adaptable to all sizes of window air conditioning units and dimensions for the window opening. The universal air conditioning support bracket includes a front rail element and an aft rail element 10. The aft rail element may be formed as a substantially L-shaped member having a plurality of apertures 12 defined in a spaced apart relation along a top surface of the aft rail element.

A front rail element includes a right rail segment 32 and a left rail segment 38 formed of an L-shaped structural member that are configured to overlap and be joined to each other. (For a common point of reference throughout the description, the left and right are defined as viewed from the interior of the structure facing the exterior of the structure, likewise the front is used to describe the direction towards the interior of the structure, and aft would refer to the direction towards the exterior of the structure.) An outer end of the right rail segment 32 has a wing extension 36 that projects from a front surface of the right rail segment 32 inwardly towards the interior of the structure, then laterally outward. A left rail segment 38 may be formed as a mirror of the right rail segment. The left rail segment has a plurality of slotted apertures 40 defined in a spaced apart relation along a top surface thereof. A left rail wing extension 42 projects inwardly towards the interior of the structure, then laterally outward. The length of the front rail element is adjusted so that the wing extensions 36 and 42 are supported from behind by a front surface of the window frame 54. Fasteners, such as bolts, pins, or screws are received through the slotted apertures 34 and 40 to join the right rail segment 32 to the left rail segment 38. The location of the apertures 34, 40 along the top surface permits them to be masked by the air conditioning unit 52 supported on the front rail element. The absence of apertures along the front surface of the front rail element presents a neat and visually appealing appearance.

A forward end of a left and right side rail 14 is attached via fasteners to the slotted apertures 34, 40 of the front rail element and an aft end of the left and right side rail 14 is attached to an aft rail element 10. Preferably, the side rails are formed as identical pieces that may be reversed in their orientation for placement on either the left or right sides of the support bracket. The side rails 14 have a substantially flat top surface for supporting a bottom of the AC unit 52 and an upwardly protruding lip 16 extending along a longitudinal length of the side rail 14. The side rails 14 are attached to the front rail element such that the upwardly protruding lip 16 is positioned laterally outwardly so that it is in abutment with a lateral side of the AC unit 52 supported by the top surface of the side rails 14.

An intermediate support rail 18 extends between the front rail element and the aft rail element 10. The intermediate support rail 18 has a substantially flat top surface to support a bottom surface of the AC unit 52. The intermediate support rail 18 has downwardly turned sidewalls 19 extending along a longitudinal length of the support rail 18. The intermediate support rail 18 is preferably mounted to a central portion of the support bracket, but may be displaced to the left or the right of center to accommodate for the center of gravity for the particular air conditioning unit 52, which due to the weight of its compressor element, tends to be located off center in many units 52. Apertures provided at an aft end of the intermediate support rail 18 are configured to receive fasteners for attachment of a pivot arm bracket 20.

A pivot arm includes a first 22 and a second 28 pivot arm segment. The pivot arms may be formed as substantially U-shaped members. An aft end of the first pivot arm segment 22 has axially aligned apertures 20 that are configured to pivotally attach the upper pivot arm to the pivot arm bracket 20. The second pivot arm segment 28 has a plurality of extension apertures 30 defined in a spaced apart relation along the lateral legs of the second pivot arm 28 segment. The extension apertures 30 are configured for adjustably joining the second pivot arm segment 28 to the first pivot arm segment 22, via a fastener, such as a pin, bolt, or screw. The length of the pivot arm is adjustable via the extension apertures 30 so that the pivot arm may support an aft end of the support bracket against an outer wall 56 of the structure.

A support foot 44 is pivotally attached to an end of the second pivot arm segment 22, via a fastener. The support foot 44 has a rearwardly extending flange 46 and apertures to receive a fastener to secure the support foot to the second pivot arm segment 22. A front surface of the support foot 44 is substantially flat, and may carry a cushioned foot pad 48 formed of a resilient material. The support foot 44 is pivotally disposed such that the substantially flat front surface may be placed in abutment with an exterior surface of the structure. The support foot 44 is pivotally adjustable to accommodate the length adjustments of the support arm as well as surface irregularities in the exterior siding of the structure.

The pivot bracket 20 may be configured to threadingly receive a threaded shaft that is rotatable in the bracket via an adjustment knob 50. The adjustment knob 50 permits selective positioning of the threaded shaft to adjust the pivotal displacement of the pivot arm in the pivot bracket 20.

In use, the components of the air conditioner support bracket may be assembled and sized according to the air conditioning unit 52 supported by the bracket and the dimensions of the opening in the structure. The left and the right rail segments 32, 38 are joined so that the wing extensions 38 and 42 of the front rail element will be in abutment with the wing frame 54 surrounding the window opening. The side rails 14 may then be joined to the front rail element and the aft rail element in a spaced apart relationship such that their respective lips 16 are in abutment with the lateral sidewalls of the AC unit 52. The intermediate rail 18, pivot arm bracket 20 and pivot arm elements 22 and 28 are attached to the support bracket.

The assembled support bracket may then be mounted in the window opening. The wing extensions 36 and 42 are positioned so that they are in abutment with the frame 54 surrounding window opening on the interior of the structure. The length of the support arm is adjusted so that foot 44 carried by the support arm is positioned in abutment with the exterior wall surface 56 of the structure. The adjustment knob 50 may then be rotated to position the pivot arm in the proper orientation relative to the frame and the exterior wall surface 56 of the structure. For most air conditioning units 52, it is highly recommended that they be installed in a substantially horizontal orientation to permit proper functioning of the compressor units and to permit the proper drainage for water vapor condensate that forms on the cold coils of the unit 52. The adjustability of the pivot arm length, its pivot angle, and the pivotal disposition of the support foot permit a wide range of adjustability for almost any type of air conditioning unit and siding configurations of exterior wall surface 56.

Once the air conditioning support bracket is mounted within the window opening, the air conditioning unit 52 is positioned on the support bracket within the window opening. Advantageously, because the unique construction and configuration of the air conditioner support bracket permits mounting without the need for the attachment of fasteners to the structure, the bracket and the air conditioning unit 52 may be installed from either the exterior or the interior of the structure. Installation from the interior is particularly advantageous for windows in a multi-story structure that are not located on a ground floor.

It should be understood, of course, that the foregoing relates to exemplary embodiments of the invention and that modifications may be made without departing from the spirit and scope of the invention as set forth in the following claims.

What is claimed is:

1. An air conditioner (AC) support bracket for installing an air conditioning unit in a fenestration, comprising:
    a front rail element having a wing extension defined at a left and a right end of the front rail element, the wing extensions configured to abut a frame surrounding an interior of the fenestration;
    a side rail element interconnecting the front rail element to an aft rail element, the side rail element having a substantially flat surface configured to support a bottom surface of the AC unit;
    an intermediate support member having a substantially flat top surface is configured to be attached between the front rail element and the aft rail element;
    a pivot bracket attached to an aft end of the intermediate support member; and
    a pivot arm configured for pivotal attachment to the pivot bracket, the pivot arm having an adjustable length by cooperative engagement of a first pivot arm segment and a second pivot arm segment.

2. The AC support bracket of claim 1, the front rail element further comprising:
    a right rail segment and a left rail segment;
    a plurality of slotted apertures defined in a spaced apart relation through a top surface each of the right rail segment and the left rail segment, wherein the right rail segment and the left rail segment are joinable to a length corresponding to a width of the fenestration, such that the wing extensions are positioned for abutment with the frame.

3. The AC support bracket of claim 1, wherein the intermediate support bracket further comprises:
    a downwardly extending sidewall along a longitudinal length of the intermediate support bracket; and
    the pivot arm bracket is attached to the downwardly extending sidewall.

4. The AC support bracket of claim 2, wherein the side rail element further comprises:
    a raised lip extending along a longitudinal length of the side rail; the lip configured to abut with a side surface of the AC unit supported on the AC support bracket.

5. The AC support bracket of claim 2, further comprising:
    a pivot aperture defined at an aft end of the first pivot arm segment;
    a corresponding pivot aperture defined in the pivot bracket,
    a fastener received through the pivot aperture and the corresponding pivot aperture.

6. The AC support bracket of claim 2, further comprising:
    a plurality of apertures defined in a spaced apart relation in a lateral sidewall of the second pivot arm segment, the plurality of apertures configured to adjustably join the first pivot arm segment to the second pivot arm segment.

7. The AC support bracket of claim 5, further comprising:
    a threaded shaft rotatable via an adjustment knob, threadingly received within the pivot bracket and configured to adjust the pivotal displacement of the pivot arm carried in the pivot bracket.

8. The AC support bracket of claim 6, further comprising:
    a support foot pivotally attached to a front end of the second pivot arm segment, the support foot having a substantially flat front surface configured to be placed in abutment with an exterior surface of the structure.

9. The AC support bracket of claim 8, further comprising:
    a cushioned foot pad attached to the front surface of the support foot.

10. An air conditioning (AC) support bracket for installing an AC unit in a fenestration, comprising:
    an adjustable length front rail element having a wing extension defined at a left and a right end of the front rail element, the wing extensions configured to abut an interior side face of the fenestration; the front rail element having a right rail segment and a left rail segment, a plurality of slotted apertures defined in a spaced apart relation through a top surface each of the right rail segment and the left rail segment, wherein the right rail segment and the left rail segment are joinable to a length corresponding to a width of the fenestration, such that the wing extensions are positioned for abutment with the frame;

a side rail element interconnecting the front rail element to an aft rail element, the side rail element having a substantially flat surface configured to support a bottom surface of the AC unit;

an intermediate support member having a substantially flat top surface is configured to be adjustably attached between the front rail element and the aft rail element at a lateral position corresponding to a center of gravity of the AC unit;

a pivot arm configured for pivotal attachment to an aft end of the intermediate support member, the pivot arm having an adjustable length by cooperative engagement of a first pivot arm segment and a second pivot arm segment, wherein the length of the pivot arm is adjustable to place a front end of the pivot arm in supporting abutment against an exterior surface of the fenestration.

11. An air conditioner (AC) support bracket for installing an air conditioning unit in a fenestration, comprising:

an front rail element having a wing extension defined at a left and a right end of a central region of the front rail element, the wing extensions configured to abut a vertical frame element surrounding an interior of the fenestration with the central region recessed within the fenestration;

a side rail element interconnecting the front rail element to an aft rail element, the side rail element having a substantially flat surface configured to support a bottom surface of the AC unit;

an intermediate support member having a substantially flat top surface is configured to be attached between the front rail element and the aft rail element;

a pivot bracket attached to an aft end of the intermediate support member; and a pivot arm configured for pivotal attachment to the pivot bracket, the pivot arm having an adjustable length by cooperative engagement of a first pivot arm segment and a second pivot arm segment.

12. The AC support bracket of claim 11, wherein the front rail element is adjustable to a width of the fenestration.

13. The AC support bracket of claim 11, wherein the front rail element further comprising:

a right rail segment and a left rail segment;

a plurality of slotted apertures defined in spaced apart relation through a top surface each of the right rail segment and the left rail segment, wherein the right rail segment and the left rail segment are joinable to a length corresponding to a width of the fenestration, such that the wing extensions are positioned for abutment with the frame.

14. The AC support bracket of claim 11, wherein the intermediate support bracket further comprises:

a downwardly extending sidewall along a longitudinal length of the intermediate support bracket; and the pivot arm bracket is attached to the downwardly extending sidewall.

15. The AC support bracket of claim 11, wherein the side rail element further comprises:

a raised lip extending along a longitudinal length of the side rail; the lip configured to abut with a side surface of the AC unit supported on the AC support bracket.

16. The AC support bracket of claim 11, further comprising:

a pivot aperture defined at an aft end of the first pivot arm segment;

a corresponding pivot aperture defined in the pivot bracket, a fastener received through the pivot aperture and the corresponding pivot aperture.

17. The AC support bracket of claim 11, further comprising:

a plurality of apertures defined in a spaced apart relation in a lateral sidewall of the second pivot arm segment, the plurality of apertures configured to adjustably join the first pivot arm segment to the second pivot arm segment.

18. The AC support bracket of claim 11, further comprising:

a threaded shaft rotatable via an adjustment knob, threadingly received within the pivot bracket and configured to adjust the pivotal displacement of the pivot arm carried in the pivot bracket.

19. The AC support bracket of claim 11, further comprising:

a support foot pivotally attached to a front end of the second pivot arm segment, the support foot having a substantially flat front surface configured to be placed in abutment with an exterior surface of the structure.

* * * * *